(12) United States Patent  (10) Patent No.: US 9,014,154 B2
Krishnan  (45) Date of Patent: Apr. 21, 2015

(54) METHOD AND APPARATUS FOR IMPROVED BASE STATION CELL SYNCHRONIZATION IN LTE DOWNLINK

(75) Inventor: Murali Krishnan, San Diego, CA (US)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 388 days.

(21) Appl. No.: 13/699,572

(22) PCT Filed: May 23, 2011

(86) PCT No.: PCT/US2011/037547
§ 371 (c)(1),
(2), (4) Date: Feb. 11, 2013

(87) PCT Pub. No.: WO2011/149832
PCT Pub. Date: Dec. 1, 2011

(65) Prior Publication Data
US 2013/0137427 A1    May 30, 2013

Related U.S. Application Data

(60) Provisional application No. 61/347,669, filed on May 24, 2010.

(51) Int. Cl.
*H04J 3/00*  (2006.01)
*H04W 48/20*  (2009.01)
*H04W 56/00*  (2009.01)
*H04W 92/10*  (2009.01)

(52) U.S. Cl.
CPC ............ *H04W 48/20* (2013.01); *H04W 56/001* (2013.01); *H04W 92/10* (2013.01)

(58) Field of Classification Search
None
See application file for complete search history.

(56) References Cited

U.S. PATENT DOCUMENTS

2003/0076801 A1* 4/2003 Aikawa et al. ............... 370/336
2008/0043702 A1* 2/2008 Moon et al. .................. 370/342

FOREIGN PATENT DOCUMENTS

| JP | 2002141886 A | 5/2002 |
| KR | 1020080010254 | 1/2008 |
| KR | 1020080016159 | 2/2008 |

* cited by examiner

*Primary Examiner* — Kwasi Karikari
*Assistant Examiner* — Randy Peaches
(74) *Attorney, Agent, or Firm* — Drinker Biddle & Reath LLP

(57) ABSTRACT

Methods and apparatus for enhancing a search performance for timing includes a mobile station that detects a plurality of signals, each from one of a plurality of cells, wherein one of the plurality of cells is identified by the mobile station as a strong cell and the remaining cells are identified by the mobile station as weak cells. A first matched filter is applied to a signal from the strong cell to detect first parameters associated with the strong cell. A second matched filter is applied to at least one signal from one or more of the weak cells resulting in at least one second matched filter output. Interference is removed from the at least one second matched filter output to detect one or more second parameters associated with one of the weak cells and to establish a timing of one of the weak cells.

23 Claims, 3 Drawing Sheets

METHOD AND APPARATUS FOR IMPROVED BASE STATION CELL SYNCHRONIZATION IN LTE DOWNLINK

PRIORITY

Priority is claimed to U.S. Provisional Patent Application No. 61/347,669, filed May 24, 2010, the disclosure of which is incorporated herein by reference in its entirety.

FIELD OF THE INVENTION

The field of the present invention is mobile wireless communication and more specifically, improvements in detection of eNodeBs (or fixed station) by user equipment.

BACKGROUND

Mobile communications systems involve two types of equipments—fixed units and mobile units. Fixed units include base stations, cells or eNodeBs that are complex and handle transmission of data from a fixed network to multiple mobile stations. Typically, the fixed units are large units which are mounted on towers to enhance their reach and coverage to extend to mobile stations in both near and far locations. Transmission from the base station to mobile stations is called downlink. Transmission of data from the user equipment to eNodeBs is called uplink. Mobile units include terminals/user equipment which are of small size, typically the size of human palms or less, and are expected to consume as little power as is possible to execute the necessary communication functionality. The mobile stations, when turned on, search for the base station with the strongest signal to establish a communication link, and then are expected to continue monitoring adjacent cells to measure their timing, frequency and ID information in the event a handover is required to be made to the adjacent cell.

To facilitate establishment of a communication link, the eNodeBs are assigned a unique ID to be detected by the user equipment. The eNodeBs transmit synchronization signals to be processed by the user equipments to detect the timing and frequency of transmission of the base station data. In particular, for LTE, the primary synchronization channel (P-SCH) is transmitted by the eNodeBs so that the user equipments can detect the timing and frequency of transmission of the eNodeBs. In addition, a secondary synchronization channel (S-SCH) is transmitted by the eNodeBs to aid in the detection of the cell ID and frame timing information. The synchronization signals used are a class of low cross-correlation sequences such that under typical operating environments, detection of one sequence is devoid of corruption by the other sequence, as the receiver at the user equipment is able to extract sufficient processing gain over the interfering sequence. However, in scenarios, where the interfering sequence is much larger in power when compared to the target sequence, the processing at the user equipment is inaccurate and results in misdetection of timing and frequency.

In LTE, a total of 504 sequences have been selected for cell ID assignment. They are further divided into 168 groups of three sequences each. In turn, the three sequences in each group are generated depending on the P-SCH sequence ID assigned to the given cell, i.e., there are only three different unique sequences called Zadoff-Chu sequences that are used for the P-SCH channel. So every cell in the cellular deployment of the eNodeBs is assigned one of the three possible sequences. It is thus possible that eNodeBs that are located next to each other may be using the same P-SCH sequence.

The channel that is available to be utilized for transmission of data is common to both eNodeBs and user equipments and comprise two components: frequency and time. Thus, access to this channel can result in contention and collisions if proper access schemes are not specified. LTE specifies two access schemes: Time Division Duplex (TDD) and Frequency Division Duplex (FDD). TDD involves sharing in time of the access channel and the entire frequency is made available for access. Time slots are assigned for uplink and downlink transmissions. Downlink TDD slots are used to multiplex in time the synchronization and user data signals. Uplink TDD slots are shared by multiple user equipments, wherein each slot is uniquely assigned to a given user equipment based on scheduling decisions at the eNodeB. FDD involves dividing the frequency space into two, with one each for uplink and downlink transmissions. For downlink transmission, the entire downlink frequency space is made available so that all the eNodeBs are transmitting at all times, though the available frequency bandwidth is less than that for TDD which is limited in time. Similarly, for uplink, all the user equipments in different cells have all the time available to transmit data within the limited frequency bandwidth made available for uplink transmissions.

In certain scenarios, the synchronization signals transmitted by different eNodeBs align fully or partially in time, causing interference to each other. For TDD, this is the case when during a downlink time slot, different eNodeBs transmit downlink data at the approximately the same time causing interference with each other at a given user equipment, even though differences in propagation delay times causes these downlink signals to be only partially aligned at the user equipment. For FDD, as the different eNodeBs are transmitting all the time, though not aligned in time, it is likely that the synchronization signals may partially overlap at the user equipment due to differences in propagation times.

Given these scenarios involving complete or partial overlap at the user equipment of the synchronization signals from different eNodeBs, techniques and apparatus are needed to enhance the search performance for timing and frequency of different cells.

SUMMARY OF THE INVENTION

The present invention is directed towards enhancing a search performance for timing and frequency information of a fixed unit, or cell.

In a first aspect, a mobile station detects a plurality of signals, each from one of a plurality of cells, wherein one of the plurality of cells is identified by the mobile station as a strong cell and the remaining cells are identified by the mobile station as weak cells. The mobile station then applies a first matched filter to a signal from the strong cell to detect first parameters associated with the strong cell. A second matched filter is applied to at least one signal from one or more of the weak cells resulting in at least one second matched filter output. Interference associated with the signal from the strong cell is removed from the at least one second matched filter output to detect one or more second parameters including a second timing position, a second frequency offset, and a second amplitude. The mobile station then selects a second timing position that yields a maximum signal magnitude to establish a timing of one of the weak cells.

Additional aspects and advantages of the improvements will appear from the description of the preferred embodiment.

BRIEF DESCRIPTION OF THE DRAWINGS

Aspects of the invention will now be further described in the following more detailed description of the specification when read with reference to the accompanying drawing in which.

DETAILED DESCRIPTION OF THE PREFERRED EMBODIMENTS

Taking into consideration the different scenarios described above involving complete or partial overlap at the user equipment of the synchronization signals from different eNodeBs, aspects of the present invention are directed to techniques whereby the strongest signal that is reliably detected is then used to enhance the search performance for timing and frequency of weaker cells. Initially, the strongest cell is first detected without any cancellation using a traditional matched filter. A matched filter is a device that correlates the incoming received signal with a local replica of the synchronization sequence and the time position yielding the largest squared output is then declared as timing of the cell. The timing position, frequency offset and amplitude information at the user equipment of the strongest cell is then stored. The weaker signals are then correlated in a similar fashion using a matched filter. During the processing of the weak cell sequence, the output of the matched filter consists of contributions from both the target cell as well as the home cell, the latter being considered interference. In embodiment of the invention, before the matched filter output is sent out for further processing to a threshold detector device, it is cleaned up by performing a cancellation of the strongest cell contribution, by multiplying the stored amplitude of the strong cell output with the cross-correlation between the strong and weak cell sequences and subtracting the result from the weak cell matched filter output. The cross-correlation values are computed on the fly or pre-stored in a look-up table and are either fixed or selected for cancellation based on the differences in arrival times at the user equipment of the signals from the eNodeBs. Given that the different eNodeBs are more or less synchronized to each other as far as frequency offset of the oscillators is concerned, the detected frequency offset information from the strongest cell detection may be used in the weaker cell detection. However, timing needs to be separately established for each cell due to differences in arrival times at the user equipment.

It must be noted that processing the composite received synchronization signal at the user equipment involves contributions from signals from different eNodeBs. For the strongest cell, there is typically sufficient processing gain over interference from the weaker cells, hence, no interference cancellation is needed. For the weaker cells, interference may be removed in a successive fashion, whereby for each successive weaker signal, the contributions of all stronger signals are cancelled. It must also be noted that any downstream processing of weaker signals such as magnitude squaring and threshold detection are performed only after the subtractive cancellation in the complex signal domain. For the case of multiple receive antennas, the cancellation may be performed separately for each antenna.

Figure 1:
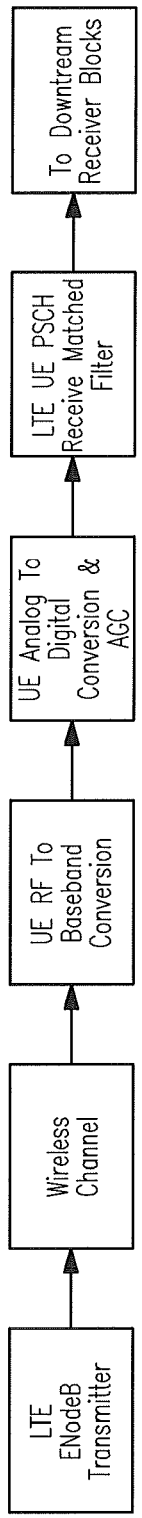
FIG. 1 is a top level block diagram of an LTE system with an eNodeB transmitter, a wireless channel, a receiver front-end that precedes the P-SCH matched filter which is then followed by downstream processing blocks.

FIG. 1 illustrates a top level block diagram of a wireless LTE communications system. In an aspect of the present invention, it is assumed that the signal received at the user equipment is a composite signal including the transmissions from different eNodeBs. As is known to those skilled in the art, processing in the matched filter, thus, involves contributions from desired and undesired signals. It is also assumed that the signal of interest for the processor in aspects of the invention are the synchronization channels only, with the goal of detecting as accurately as possible the timing and frequency offset of each eNodeB signal. It is further assumed that due to differences in the arrival times of these signals at the user equipment, the synchronization signals may overlap either wholly or partially in time at the user equipment. It is very unlikely that the signals will completely overlap as that means the propagation delays from the eNodeBs to the user equipment are identical. However, even for some cases of partial overlap, significant gains over no interference cancellation may be achieved.

Figure 2:
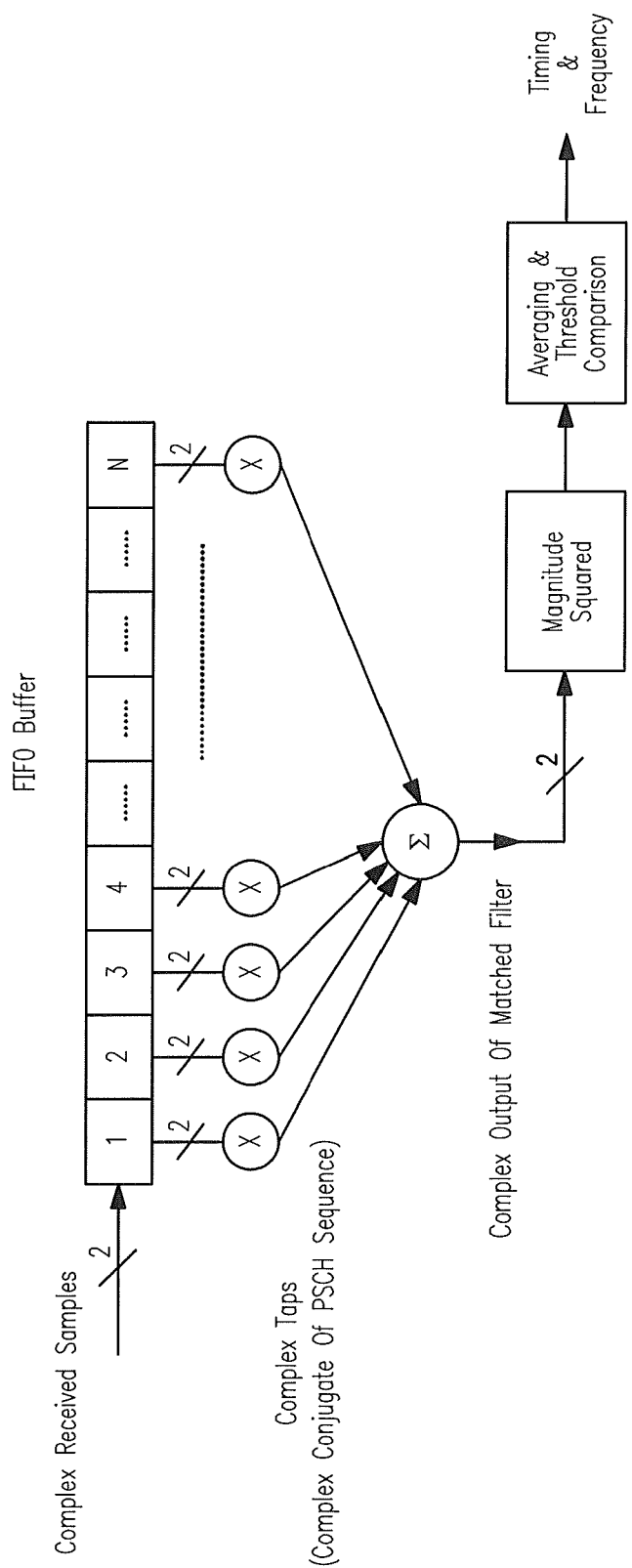
FIG. 2 is a block diagram of a conventional matched filter that is the receiver of traditional choice to process synchronization signals for timing and frequency offset detection.

FIG. 2 illustrates a conventional matched filter that is used to demodulate a P-SCH signal. The matched filter shown in FIG. 2 is the most widely used receiver for processing the synchronization channel. It involves a tapped delay line (FIFO) of length 64 (different vendors may use different lengths). For every clock tick, a complex sample is shifted into the FIFO and the contents of FIFO are multiplied by the complex filter taps and then added together. The taps are complex conjugate of the P-SCH sequence being detected. There are three matched filtering operations involved, each one searching a unique P-SCH sequence. The squared magnitude of the complex correlation output is then computed and added across the receive antennas, each of which is independently processed. This is then averaged across sub-frames to yield the decision statistic. The decision statistic is then compared to a threshold to establish the presence or absence of an eNodeB. In the conventional P-SCH receiver, the correlations are independent with no inputs from the other correlation branches. Given that the received signal at the user equipment is a composite signal from multiple eNodeBs, the correlation outputs are actually corrupted by the mutual interference between eNodeBs.

Figure 3:
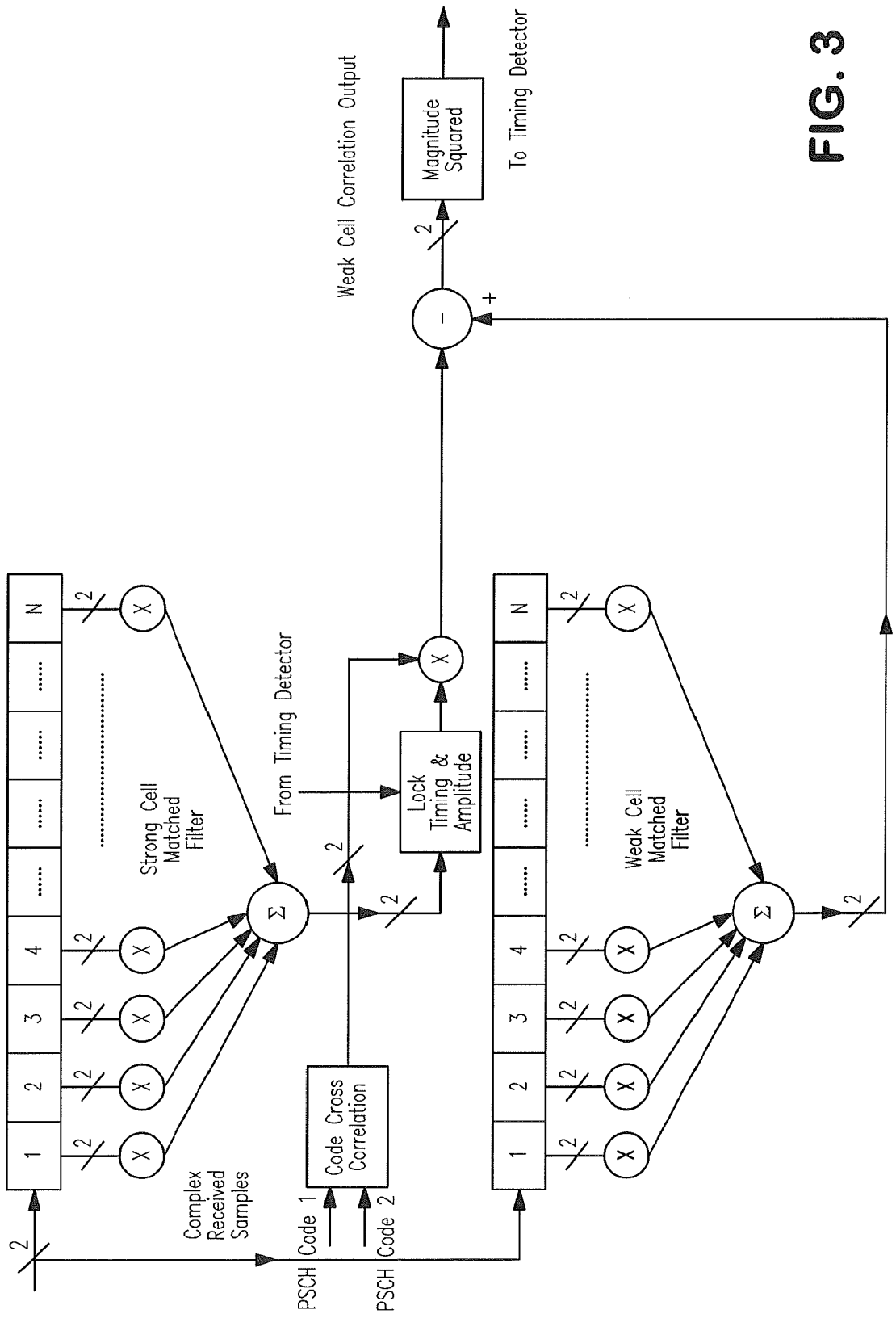
FIG. 3 is a block diagram of an aspect of the present invention illustrating how the complex outputs of the matched filter are processed before being sent for downstream processing.

FIG. 3 illustrates an aspect of the present invention indicating cancellation of strong cell P-SCH signal from weak cell P-SCH signal detection. As shown in FIG. 3, the mutual interference between the P-SCH codes is cancelled before testing against a threshold. A matched filter is first used to detect the timing and frequency of the strong cell received at the user equipment. No interference cancellation is necessary as the received signal has sufficient processing gain over noise and other interference. The timing, frequency and complex amplitude of the strong cell signal are locked at the point that results in maximum averaged correlation magnitude and passes a threshold crossing criterion. A second matched filter is then initiated to start detecting timing of the weaker cell and is tested at successive timing positions. At each timing position being tested, the correlation output of the weak cell matched filter is cleaned up by subtracting the contribution from the strong cell signal. This complex value to be subtracted is derived as the stored strong cell correlation value multiplied by the complex cross correlation value between the strong and weak cell P-SCH codes. The timing position that yields the maximum correlation passing a threshold crossing test is established as the timing of the weaker cell. It must be noted that though frequency offset needs to be estimated from the strong cell signal, the process need not be repeated for the weak cell signal and the detected offset for strong cell signal may be reused in the detection of weak cell timing, thus, reducing the complexity needed for weak cell processing. In summary, each timing position for each weak cell PSCH code is tested by first subtracting the stored peak output of the detected strong cells weighted by the cross correlation between weak cell and strong cells under consideration.

Figure 4:
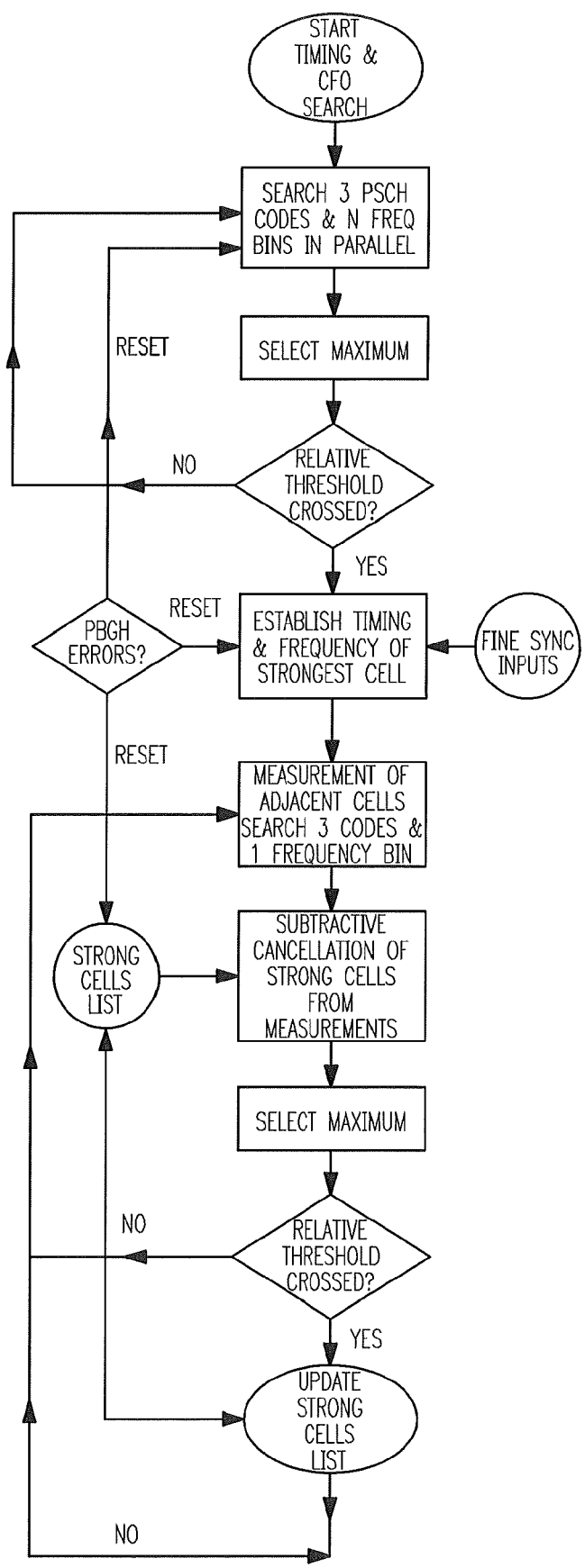
FIG. 4 is a flow chart illustrating how stronger cells may be cancelled during the processing of weaker signals.

FIG. 4 illustrates a flow chart of how the weaker cells may be detected by applying the interference cancellation described above in a successive fashion. As shown in the figure, the timing and frequency of strongest cell is first established by searching all 3 P-SCH codes and N frequency offset bins without any interference cancellation. The frequency bin and timing position that results in the highest correlation magnitude and that crosses a specified threshold is locked in as the frequency offset and timing of the strongest cell at the user equipment. This cell is entered into the strong cell list and added as a signal to be cancelled for detecting weaker cells. For the detection of weaker cells, only one frequency bin is searched as shown in FIG. 4. As more and more cells are detected, they are added as candidates to be cancelled from the detection of still weaker signals, thus, leading to a successive manner in which weaker cell detection is improved. It must be noted that each time, the cross correlation value is computed between the weak cell P-SCH code being tested and the strong cell being cancelled. The search and measurement process may be allowed to run continuously as the amplitude and timing of the different cells may change over time owing to the mobility of the user equipment and strong cell list needs to be refreshed.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method for improving a search for a timing of at least one cell, the method comprising:
   detecting, at a mobile station, a plurality of signals, each from one of a plurality of cells, wherein one of the plurality of cells is identified by the mobile station as a strong cell and the remaining cells are identified by the mobile station as weak cells;
   applying a first matched filter to the signal from the strong cell to detect first parameters associated with the strong cell;
   applying a second matched filter to at least one signal from one or more of the weak cells, resulting in at least one second matched filter output;
   removing from the at least one second matched filter output interference associated with the signal from the strong cell to detect one or more second parameters, including a second timing position, a second frequency offset, and a second amplitude; and
   selecting, at the mobile station, the second timing position that yields a maximum signal magnitude to establish a timing of one of the weak cells.

2. The method of claim 1, wherein the strong cell has a signal to noise ratio greater than the weak cells.

3. The method of claim 1, wherein the removing interference comprises:
   multiplying a first amplitude associated with the strong cell, with a cross-correlation value between strong and weak sequences associated with the strong cell and the weak cells, respectively, resulting in a complex value; and
   subtracting the complex value from the second matched filter output.

4. The method of claim 3, wherein the second matched filter output includes the complex value of both a target cell and a home cell.

5. The method of claim 3, further comprising:
   storing the cross-correlation value in a look-up table, wherein the cross-correlation value is either fixed or selected based on differences in mobile station arrival times of the plurality of signals.

6. The method of claim 1, wherein the applying the second matched filter includes reusing a first frequency offset of the first parameters.

7. The method of claim 1, further comprising locking a first timing position, a first frequency offset, and a first amplitude of the signal from the strong cell at a point that maximizes the signal from the strong cell.

8. The method of claim 1, further comprising identifying the one of the weak cells as the strong cell.

9. An apparatus for enhancing a search performance for timing and frequency information of at least one cell, the apparatus comprising:
   a mobile station configured to:
      detect a plurality of signals, each from one of a plurality of cells, wherein one of the plurality of cells is identified by the mobile station as a strong cell and the remaining cells are identified by the mobile station as weak cells;
      apply a first matched filter to a signal from the strong cell to detect first parameters associated with the strong cell;
      apply a second matched filter to at least one signal from one or more of the weak cells, resulting in at least one second matched filter output;
      remove from the at least one second matched filter output interference associated with the signal from the strong cell to detect one or more second parameters, including a second timing position, a second frequency offset, and a second amplitude; and
      select the second timing position that yields a maximum signal magnitude to establish a timing of one of the weak cells.

10. The apparatus of claim 9, wherein the strong cell has a signal to noise ratio greater than the weak cells.

11. The apparatus of claim 9, wherein the mobile station is further configured to:
    multiply a first amplitude associated with the strong cell, with a cross-correlation value between strong and weak sequences associated with the strong cell and the weak cells, respectively, resulting in a complex value; and
    subtract the complex value from the second matched filter output.

12. The apparatus of claim 11, wherein the second matched filter output includes the complex value of both a target cell and a home cell.

13. The apparatus of claim 11, wherein the mobile station is further configured to:
    store the cross-correlation value in a look-up table, wherein the cross-correlation value is either fixed or selected based on differences in arrival times associated with the plurality of signals from the strong and weak cells.

14. The apparatus of claim 9, wherein the mobile station is further configured to reuse a frequency offset associated with the signal from the strong cell.

15. The apparatus of claim 9, wherein the mobile station is further configured to lock a first timing position, a first frequency offset and the first amplitude of the signal from the strong cell at a point that results in a maximum averaged correlation magnitude.

16. An apparatus for improving a search for a timing of at least one cell, the apparatus comprising:
- means for detecting a plurality of signals, each from one of a plurality of cells, wherein one of the plurality of cells is identified by the mobile station as a strong cell and the remaining cells are identified by the mobile station as weak cells;
- means for applying a first matched filter to a signal from the strong cell to detect first parameters associated with the strong cell;
- means for applying a second matched filter to at least one signal from one or more of the weak cells, resulting in at least one second matched filter output;
- means for removing from the at least one second matched filter output interference associated with the signal from the strong cell to detect one or more second parameters, including a second timing position, a second frequency offset, and a second amplitude; and
- means for selecting the second timing position that yields a maximum signal magnitude to establish a timing of one of the weak cells.

17. The apparatus of claim 16, wherein the strong cell has a signal to noise ratio greater than the weak cells.

18. The apparatus of claim 16, wherein the means for removing interference comprises:
- means for multiplying a first amplitude associated with the strong cell, with a cross-correlation value between strong and weak sequences associated with the strong cell and the weak cells, respectively, resulting in a complex value; and
- means for subtracting the complex value from the second matched filter output.

19. The apparatus of claim 18, wherein the second matched filter output includes the complex value of both a target cell and a home cell.

20. The apparatus of claim 18, further comprising:
- means for storing the cross-correlation value in a look-up table, wherein the cross-correlation value is either fixed or selected based on differences in arrival times of the plurality of signals.

21. The apparatus of claim 18, wherein the means for applying the second matched filter includes means for reusing a first frequency offset associated with the signal from the strong cell.

22. The apparatus of claim 16, further comprising means for locking a first timing position, a first frequency offset and a first amplitude of the signal from the strong cell at a point that maximizes the signal from the strong cell.

23. The method of claim 16, wherein identifying the one of the weak cells as the strong cell.

* * * * *